March 30, 1943.   H. T. FAUS   2,315,408
MAGNETIC SUSPENSION
Filed Oct. 12, 1939
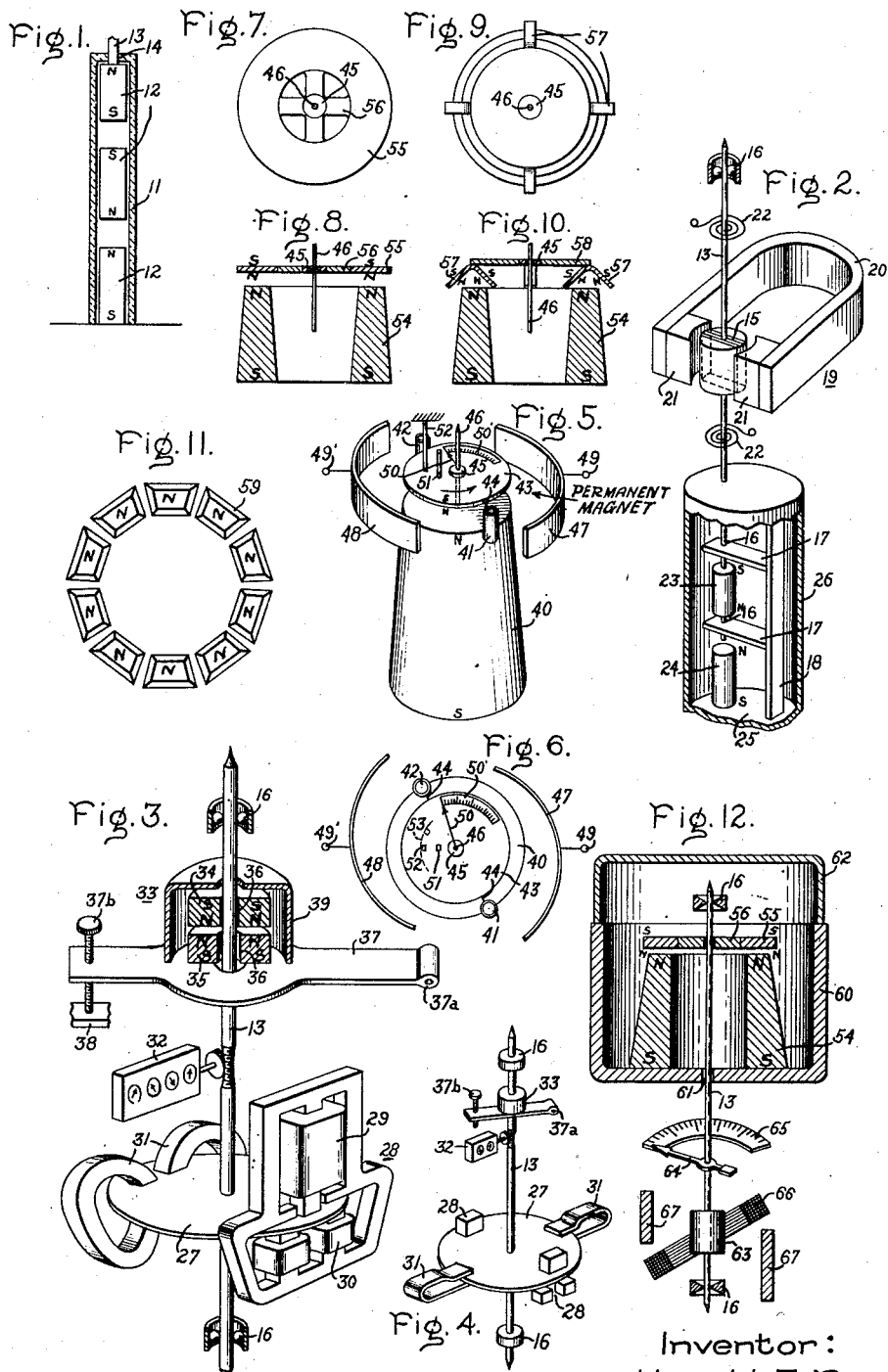
Inventor:
Harold T. Faus,
by Harry E. Dunham
His Attorney.

Patented Mar. 30, 1943

2,315,408

UNITED STATES PATENT OFFICE 2,315,408

MAGNETIC SUSPENSION

Harold T. Faus, Lynn, Mass., assignor to General Electric Company, a corporation of New York Application October 12, 1939, Serial No. 299,131

15 Claims. (Cl. 308—1)

This invention relates to an improved means for suspending mechanical elements and, though having other and broader fields of application, it relates more particularly to means for magnetically suspending movable elements such as those employed in electrical measuring instruments.

It is an object of my invention to provide a new and improved magnetic suspension.

It is another object of my invention to provide an improved magnetic suspension for rotary elements employing permanent magnets of high coercive force magnetic materials.

It is still another object of my invention to provide a simple and improved magnetic means for compensating for the weight of the movable elements in measuring instruments, meters, clocks and the like, which reduces to a minimum the mechanical friction acting on the movable element, which is of rugged construction, and which is capable of withstanding the effects of vibrational forces.

It is a further object of my invention to provide an improved magnetic suspension for a rotary element in which a slight lateral relative displacement between the aligning bearing and the suspended element is not accompanied by a strong sidewise pressure on the bearing.

It is a still further object of my invention to provide a single bearing type of repulsion magnetic suspension which is free to revolve in a horizontal plane.

It is another object of my invention to provide a magnetic suspension of the above character in which the rotation or movement of the movable element is not affected by extraneous torques due to hysteresis and eddy currents.

Other objects and advantages of my invention will become apparent as the description proceeds.

According to a preferred form of the apparatus which I have provided to illustrate the principles of my invention, I employ a plurality of permanent magnets magnetized with their polar axes vertical and in axial alignment and arranged so that they exert a magnetic repulsion force on each other. I secure one of the magnets to a fixed support such as, for example, the casing of an electrical instrument and mount the other magnet on the movable shaft or element to be suspended. I provide means including one or more jewels or guide bearings for maintaining the movable element free from lateral displacement.

The features of my invention which I believe to be novel and patentable will be pointed out in the appended claims. For a better understanding of my invention reference may be had to the following description considered in connection with the accompanying drawing in which Fig. 1 represents an elevational view, partly in section, of apparatus employed to illustrate the principle of my invention; Fig. 2 represents a perspective view, with a portion cut away, of one form of measuring instrument having its rotary element suspended in accordance with my invention; Fig. 3 represents a perspective view, partly in section, of an induction type alternating current watthour meter utilizing the principle of my invention; Fig. 4 illustrates in perspective and on a smaller scale, a modified form of watthour meter with which my invention is employed; Figs. 5 and 6 represent, respectively, perspective and plan views of a modified form of apparatus; Figs. 7, 9 and 8, 10 represent, respectively, plan and sectional elevation views of two modified forms of magnetic suspension devices; Fig. 11 shows a modified form of permanent magnet which may be employed with my invention; and Fig. 12 is a sectional elevation view of a permanent magnet armature type electrical measuring instrument utilizing a magnetic suspension constructed in accordance with my invention.

Referring to Fig. 1 of the drawing, I have illustrated a vertical tube 11 which may be constructed of a non-magnetic material such as glass, for example, and in this tube I have positioned a plurality of prismatic or cylindrical bar type permanent magnets 12 with their polar axes vertical and in line and so arranged that like poles of adjacent bars confront each other. The magnetic repulsion serves to keep the magnets apart with one floating above the other. If the bars are made of successively decreasing length from the bottom to the uppermost one they will float one above the other with a uniform spacing. To the uppermost magnet I may secure a shaft or rod 13 passing through an opening 14 in the closed end portion of the tube 11. Magnets arranged one above the other in this fashion have no stability against tipping and they will normally touch the tube 11 at two points. This may be prevented, however, so far as the uppermost magnet is concerned by providing guide bearings for the shaft 13.

In Fig. 2 I have illustrated an electrical measuring instrument of the d'Arsonval type of construction having a magnetic suspension embodying the principle of my invention. In the arrangement illustrated, a shaft or spindle 13 carrying a movable current element 15 is journalled in an upper jewel or guide bearing 16 of any suitable construction and one or more lower jewels or guide bearings 16, the lower guide bearings being arranged in a plurality of horizontal arms 17 which project from a supporting element 18. The movable element 15 is positioned about a soft iron cylinder and adapted to rotate in the magnetic field formed by the field structure 19 comprising a permanent magnet 20 and pole pieces 21. The current to be measured is conducted to the movable coil 15 by means of a plurality of control springs 22.

The movable element 15 is magnetically suspended by means of cylindrical permanent magnets 23 and 24. The magnet 23 is secured to the shaft 13 of the movable element at a suitable point, such as a position intermediate the horizontal arms 17 and is thus free to rotate. The magnet 24 is fixedly secured to the base 25 or other suitable fixed means about the instrument. As indicated in the drawing, the magnets are polarized in a direction parallel to the vertical axis of the shaft and they are positioned with their polar axes in vertical alignment with a pole of one magnet confronted by a like pole of the other magnet.

The members constituting the magnetic suspension in Figs. 1 and 2, i. e. the permanent magnets 12 and 23, 24, respectively, are composed preferably of a material having a high coercive force, in order to maintain a high degree of magnetization and to provide a compact construction with relatively short and comparatively lightweight magnets. While my invention is not limited to the use of any particular materials, I have found that satisfactory results may be obtained by the employment of an aluminum, nickel, iron alloy composed of nearly 10% aluminum and approximately 20% nickel, and, if desired, also a small percentage of cobalt.

It will of course be understood that the shaft 13 may carry a pointer as usually employed with such instruments, or it may have a light-beam indicator in which case a mirror or reflecting surface may be secured to and adapted to rotate with the shaft. The member 26 is a cylindrical shield of highly permeable magnetic material such as, for example, soft iron or a nickel-iron alloy. This member serves to shield the instrument from the field produced by the permanent magnets 23 and 24. In a construction of this character the fields of the suspension magnets 23 and 24, the instrument field magnet 20, and that produced by the movable coil 15 are of comparable magnitude, so that without such a shielding arrangement each field would affect the other.

The operation of the device of Fig. 2 is believed to be clear. The system is in equilibrium in regard to tipping, as well as both vertical and lateral displacement, and if a homogeneous magnetic material is employed there will be no hysteresis or eddy current torques to retard rotation about the axis of the magnets. Since a magnet of the character employed is capable of supporting an additional weight equal to more than its own weight, it is evident that a relatively heavy moving element may be magnetically suspended and as long as the shaft is kept vertical, there will be a very small amount of friction.

In Fig. 3 I have illustrated my invention in connection with the suspension of the rotary element of an induction type alternating current watthour meter. The meter includes the usual vertical operating shaft 13 of non-magnetic material journalled for rotation in upper and lower jewels or guide bearings 16 of a suitable construction which produces a minimum friction on the moving element. Attached to the shaft 13 is a current conducting disk 27 which cooperates with an alternating current field producing element 28 comprising a potential element 29 and a current element 30 which produce rotation of the shaft 13 in accordance with the measured quantity. A plurality of permanent magnets 31 are provided to regulate the rotation of the disk 27. A suitable registering mechanism 32 operated in accordance with the shaft rotation gives an indication of the energy measured over a period of time.

I provide an assembly 33 comprising two permanent magnets 34 and 35 for magnetically suspending the rotary shaft 13 and the disk 27. As indicated these magnets are of generally cylindrical shape and are constructed in the form of an annular plate or disk with an opening 36 extending along the longitudinal axis. The magnet 34 may be cemented to the shaft 13 about the wall of the opening 36 or secured thereto in fixed relation by other suitable means. The lower permanent magnet 35 is positioned with the wall of its central or axial opening surrounding the shaft and is arranged so that the pole of one magnet confronts the like pole of the other magnet. The magnets being polarized axially or longitudinally of the apertured cylinders composing them and they being positioned about the same vertical axis, their polar axes are likewise in vertical alignment. The permanent magnet 35 is supported from the meter frame by means of a supporting member 37 pivotally mounted to the instrument frame at 37a and provided with an adjusting screw 37b which rests against a member 38 fixed to the meter frame. The magnet 35 being fixed to the supporting member 37, the vertical position of the shaft 13 and the disk 27 may be adjusted by turning the adjusting screw to raise or lower the permanent magnet 35.

The assembly 33 also comprises a shield 39 of high permeability magnetic material such as soft iron, for example, which encloses the magnets 34 and 35 and serves to magnetically shield them from stray fluxes. The member 37 may be composed of either magnetic or non-magnetic material but it is preferable to employ magnetic material on account of its shielding effect. Such a construction prevents the field of the meter magnets 31 from acting on the floating magnet 34 to produce a side thrust on the bearing. Furthermore, if it were not for the shielding arrangement the alternating field of the meter element would act on the floating magnet to produce vibration of the moving element, and short circuits in the circuit to which the current coils 30 are connected would partially demagnetize both the floating magnet 34 and the supporting magnet 35. In arranging the shield about the magnets it is desirable to avoid close clearance between the sides of the shield and the magnets since this would tend to cause large side thrusts to be applied to the guide bearings when the magnets are not accurately centered in the shield.

While I may also employ the same magnetic material in the construction of the magnets 34 and 35 as described in connection with the magnets of Figs. 1 and 2, I prefer to use a magnetic material of still higher coercive force. By using a material of higher coercive force, I find it considerably less difficult to apply the principle of a magnetic suspension, employing floating magnets with their axes vertical and in line, to a watthour meter of standard construction. While I do not intend to limit my invention to the use of any particular materials, I have found that highly satisfactory results may be obtained by the employment of a magnetic material known as sintered oxide. This material may be prepared and magnetized as follows:

Mix together finely powdered magnetite, ferric oxide, and cobaltic oxide in the proportion of 43.6 per cent of magnetite, 30.1 per cent of ferric oxide, and 26.3 per cent of cobaltic oxide. Mold the mixture in the shape desired under pressure of from three to five tons per square inch. Remove from the mold and heat in an atmosphere of nitrogen or air for two to three hours at about 1020° C. and allow to cool. Then reheat to about 520° C. in a special furnace placed in the air gap of a direct-current electromagnet with a field of about 3000 H. With the field on, lower the temperature to about 300 or 320° C. and hold in the field within this range of temperature for about three-quarters of an hour. Then allow to cool in the field to below 100° C. The material may then be machined or ground to shape if necessary.

This material after being magnetized, in addition to being a permanent magnet of exceptionally high coercive force and low residual induction, is very light in weight as compared to other magnetic materials. The coercive force of the material prepared as previously described is between 700 and 1000 oersteds and it has a residual induction of about 2,200 gausses. The permanent magnet strength of this material is several times that of permanent magnet steel for the same size and shape of magnet and the material is only about half the weight of such steel. Permanent magnets made from this material can thus be made very short in the direction of their polar axes and are thus quite suitable for suspending a moving element where compactness, reduction in inertia, and increased lightness are important factors. As an example of a magnetic suspension which I have mounted on a standard meter, I employ a 1½ gram magnet on the moving element working with a magnet of equal weight attached to the base or frame of the instrument. This suspension supports the 13 gram moving element of the meter and its operation has been found satisfactory with the meter operating at loads up to 400% of its rated capacity.

In Fig. 4 I have shown a perspective view of a modified form of watthour meter the rotary element of which is magnetically suspended in accordance with my invention. In this construction the watthour meter is provided with two meter elements each of which includes an alternating current field producing element 28 and regulating or braking magnets 31. As will readily be observed, the two driving elements 28 are positioned in diametrically opposed relation about the disk 27. The two braking magnet elements 31 are also positioned diametrically opposite each other, and displaced 90° from the driving elements with respect to the center of the disk. The guide bearings and suspension assembly 33 are of the same construction as the corresponding elements illustrated in Fig. 3.

In the arrangement of Fig. 3 I have found in some cases that there is a small amount of side thrust on the guide bearings due to the torque of the braking magnet 31 acting in opposition to that of the driving element 28. This thrust, being horizontal, cannot be balanced readily by magnetic means. A meter constructed in accordance with Fig. 4, however, provides an arrangement in which the side thrust on the bearings is substantially eliminated.

Figs. 5 and 6 represent perspective and plan views, respectively, of an electrostatic voltmeter in which the movable element is magnetically suspended according to the principles of my invention. In this arrangement I employ preferably a vertical substantially cylindrical, or truncated conical, permanent magnet 40 which may be constructed of the same material as employed for the magnets 23 and 24, although 36% cobalt steel or other high coercive force materials would be satisfactory. The use of a magnet of this construction provides a higher concentration of flux at the small end than would be the case if the magnet had a uniform diameter throughout its length equal to that of the small end. As indicated in the drawing, the magnet 40 is magnetized in the direction of its longitudinal axis.

The movable element consists of two hollow metal cylinders 41 and 42 which are secured in fixed relation to a disk 43 by insulating members 44. The disk 43 is made very thin and is provided with a jewel or central bearing element 45 of the ringstone type or other suitable construction wherein the retarding force acting on the moving element may be made as low as possible. I provide a shaft or arbor 46 of non-magnetic material which may be secured to the magnet 40 or other suitable fixed supporting means. The disk 43, constructed of magnetic material, is magnetized across its thickness and is placed on the shaft 46 so that like poles of the disk and cylinder confront each other. With this construction the disk 43 is free to revolve about the shaft 46 as a center and the bearing is free to slide up and down the shaft. This bearing, however, does not prevent the moving element from tipping although the latter is magnetically stable against tipping and vertical displacement.

While I do not intend to limit my invention to the use of a particular material, I prefer to construct the disk 43 from a magnetic material which is capable of being magnetized across a very thin dimension. A suitable composition for the disk I have found to be a silver-manganese-aluminum alloy comprising approximately 87 per cent of silver, 8.7 per cent of manganese, and 4.3 per cent of aluminum. However, a wide variation in percentages is permissible. Such an alloy has been produced having a coercive force of approximately 6,000 oersteds which permits the employment of a thin disk 43 and one which will at the same time withstand a large demagnetizing force. The disk can be made very light in weight in comparison to other permanent magnets which is obviously a highly desirable characteristic in an instrument of this type.

I provide a plurality of fixed attracting elements in the form of curved plates 47 and 48 which cooperate with the movable metal cylinders 41 and 42, respectively. The curved plates and the movable parts are not concentric as clearly shown in the drawing.

In operation, when the potential to be measured is applied to the terminals 49 and 49' of the plates 47 and 48 charges are induced on the movable metallic elements 41 and 42 and since the plates and the movable elements are not concentric, the disk 43 will turn in the direction of the arrow to increase the electrostatic capacity of the arrangement. A pointer 50 may be secured in fixed relation to the shaft 46 and adapted to cooperate with a movable scale 50' secured to the disk 43. The scale may be altered by changing the shape of the plates. In order to control the neutral position of the disk 43, I prefer to employ a member 51 of high permeability magnetic material such as permalloy, for example, attached to the disk 43 in any suitable manner. I provide a second strip 52 preferably composed of the same material and mounted to be adjustably positioned on a stationary member so that it may be moved to various points along the path 53. With this arrangement, the magnetic strip 51 is magnetized by the permanent magnet disk 43, and by moving the strip about the path 53, the strip 51 will be attracted, thereby positioning the disk at the desired point for the zero or neutral position.

In the arrangement described, I have provided a single bearing type of repulsion magnetic suspension in which the movable element is free to revolve about a vertical axis in a horizontal plane, magnetic forces hold the disk 43 in equilibrium against tipping and against vertical motion, and the single guide bearing prevents sidewise movement. Due to the single bearing and the virtual absence of hysteresis and eddy current effects, the disk turns very freely.

The disk 43 of the single bearing magnetic suspension shown in Figs. 5 and 6 is stable horizontally but this stability may be disturbed by non-uniformity of the magnetic material in the disk or in the supporting magnet 40.

In Figs. 7 and 8 I have illustrated a modification whereby improved stability in the horizontal plane may be obtained by making the fixed supporting magnet 54 in the general form of a cylinder or frusto-conical member having an aperture extending along the longitudinal axis thereof, and the floating member in the form of a flat ring or annulus 55 in lieu of the disk 43. The ring and the magnet 54 may be composed of the same magnetic materials as described in connection with the corresponding members of Figs. 5 and 6. In order to mount the ring for rotation, I may employ a spider 56 of aluminum or other suitable non-magnetic material and secure it to the inner periphery of the ring by any convenient means. The spider is provided with a ringstone or other suitable central bearing 45 which provides for freedom of rotary and vertical movement about the fixed vertical shaft 46.

In Figs. 9 and 10 I have shown a modification similar to the arrangement of Figs. 7 and 8, for providing improved stability in the horizontal plane, which employs the same type of supporting magnet 54, but in this case the floating member is in the form of a number of radially disposed magnets 57 bent at right angles. However, my invention is not limited to such a configuration but obviously includes the arrangement in which the magnets 57 are flat or bent in the form of a curve. The magnets 57 may also be constructed of the silver-manganese-aluminum alloy already described, and they may be uniformly positioned about a non-magnetic disk 58 which is provided with a central guide bearing 45 of the type employed in Figs. 4 and 7. With each of the magnets magnetized across its thin dimension or thickness there will be a resultant field parallel to the axis.

An alternative arrangement to the apertured substantially cylindrical, or conical, magnet 54 is a number of bar magnets 59 arranged in a circle as illustrated in the plan view of Fig. 11. In this case, however, only the flat ring-shaped floating magnet 55 of Figs. 7 and 8 may be used. That is, a number of magnets may be used in either the moving member, as shown in Figs. 9 and 10, or in the fixed supporting member, as shown in Fig. 11, but one of the members must have a continuous pole piece around its entire circumference.

It will of course be appreciated that the instrument of Figs. 5 and 6 is illustrative of a device which may also be employed with the suspensions of Figs. 7 to 11.

For comparable weight-supporting ability, the arrangements of Figs. 7 to 11 may be placed in a much smaller vertical space than that required for a simple rod and disk as shown in Figs. 5 and 6, and stability in the horizontal plane is greatly improved.

In Fig. 12 I have illustrated my invention employed in connection with a permanent magnet rotor type electrical instrument, such as that disclosed and claimed in my prior Patent 2,102,409 and in my copending application Serial No. 295,597, filed September 19, 1939. The magnetic suspension is similar to that of Figs. 7 and 8, but differs in that the thin or flat permanent magnet ring or annulus 55 and the non-magnetic spider or disk 56 are secured fast to the shaft 13 to support the latter and to rotate therewith. The non-magnetic shaft 13 is provided with upper and lower guide bearings 16 of a suitable construction. The magnets 54 and 55 may be constructed of the same materials as the corresponding magnets described in connection with Figs. 7 and 8 and they are likewise magnetized so that a pole of one magnet is confronted by a like pole of the other magnet. I may also employ a magnetic member about the magnets 54 and 55 including a cup-shaped portion 60, with a central opening 61 for the shaft 13, and a cover 62. This member serves to shield the supporting magnets.

The measuring instrument comprises a cylindrical permanent magnet armature 63, magnetized across a diameter thereof, and mounted on the rotary shaft 13. The shaft also carries a pointer 64 which cooperates with a stationary scale 65. The permanent magnet 63 is preferably constructed of a sintered oxide material, as already described. A stationary coil 66 wound in an inclined position with respect to the shaft 13, surrounds the armature and produces a horizontal component of flux thereacross proportional to the measured quantity. A plurality of thin permanent magnets 67 arranged in diametrically opposed relation are magnetized across their thin dimension to produce a flux which links the magnetic armature 63. These magnets may be rotated relative to the stationary scale 65 to control the zero position of the armature 63, and by moving one of them in the vertical direction the magnitude of the magnetic control flux linking the armature 63 may be controlled to vary the scale of the instrument. For purposes of clarification I have omitted showing any damping means for the rotor element and magnetic shielding means for the elements of the instrument but if such means are desired they may be arranged as disclosed in my prior Patent 2,102,409 and my copending application already referred to.

It will be appreciated that while I have shown a permanent magnet as the lower stationary magnetic supporting element in all the figures of the drawing, my invention is not limited to such a construction, but obviously includes the arrangement in which the lower or fixed magnetic force producing means is replaced by a solenoid energized by direct current.

In accordance with the provisions of the patent statutes, I have described the principle of operation of my invention together with the apparatus which I now consider to represent the best embodiments thereof but I desire to have it understood that the apparatus shown is only illustrative and that the invention may be carried out by other means.

What I claim as new and desire to secure by Letters Patent of the United States, is:

1. In combination, a rotatable member to be supported for rotation about a vertical axis, a permanent magnet flux producing means mounted in fixed relation with said rotatable member and adapted to rotate therewith, said permanent magnet being polarized in a direction parallel to the axis of rotation, a second flux producing means in axial alignment with and adjacent said permanent magnet, the relative polarities of said flux producing means being such that one of the poles of said magnet is confronted by a like pole of said second flux producing means, whereby said rotatable member is floatingly supported by a magnetic force of repulsion in opposition to the force of gravity.

2. In combination, a rotatable member including a shaft adapted to rotate about a vertical axis, a permanent magnet secured in fixed relation to said shaft for rotation therewith, said permanent magnet being polarized in the direction of its rotary axis, a second permanent magnet disposed coaxially with and adjacent said first permanent magnet, said second permanent magnet being polarized in a direction parallel to the axis of rotation of said first permanent magnet, the relative polarities of said magnets being such that one pole of one of the magnets is confronted by a like pole of the other magnet, whereby said shaft is floatingly supported by a magnetic force of repulsion in opposition to the force of gravity.

3. In combination, a rotatable shaft mounted for rotation about a vertical axis, a short substantially cylindrical permanent magnet having an aperture extending along the longitudinal axis thereof and positioned coaxially in fixed relation with said shaft and polarized in a direction parallel to said shaft, a second permanent magnet having a central longitudinal opening therethrough for accommodating said shaft, said second permanent magnet being mounted in axial alignment with said first permanent magnet, the relative polarities of said magnets being such that a pole of one magnet is confronted by a like pole of the other magnet to exert a repulsion force for supporting said shaft.

4. In a magnetic suspension, a shaft to be supported and adapted to rotate about a vertical axis, a substantially flat annular permanent magnet secured to said shaft for rotation therewith, said magnet being polarized in a direction parallel to said shaft, a second permanent magnet of generally cylindrical form having an aperture extending longitudinally therethrough, said second permanent magnet being disposed coaxially and in vertical alignment with said first permanent magnet and being polarized in a direction parallel to the axis of rotation of said vertical shaft, and the relative polarities of said magnets being such that a pole of one magnet confronts a like pole of the other magnet to produce a repulsion force for floatingly supporting said shaft.

5. The combination in a magnetic suspension device of a generally cylindrical permanent magnet polarized in the direction of its longitudinal axis, a shaft arranged in axial alignment with said permanent magnet, a body to be supported, a second permanent magnet secured to said body and provided with a central bearing for rotation about said shaft, said second magnet being polarized in a direction parallel to its axis of rotation, the relative polarities of said magnets being such that a like pole of one magnet is in axial alignment and in confronting relation with a like pole of the other magnet, whereby said second magnet is floatingly supported by a magnetic force of repulsion against the force of gravity and lateral displacements.

6. In a magnetic suspension, a generally cylindrical permanent magnet polarized in the direction of its longitudinal axis, a shaft positioned in a vertical direction and arranged coaxially with said permanent magnet, a plurality of radially disposed permanent magnets uniformly spaced about a circular path and mounted for rotation about said shaft, said permanent magnets being polarized to produce a resultant flux in a direction parallel to said axis of rotation, the polarities of said magnets being such that a pole of each confronts a like pole of said cylindrical permanent magnet, whereby said rotatable member is floatingly supported in opposition to the force of gravity.

7. In a magnetic suspension, a rotating element to be supported for rotation about a vertical axis, an annular permanent magnet flux producing means polarized in the direction of its longitudinal axis and positioned with its axis of polarization in alignment with said vertical axis, a second magnetic flux producing means providing a resultant flux parallel to and in opposition to the flux produced by said annular permanent magnet, said second flux producing means comprising a plurality of radially disposed permanent magnets arranged in a substantially circular path, and means for securing one of said flux producing means to said rotating element for rotation therewith, said other flux producing means being secured to a stationary support.

8. In combination, a rotary element, means for mounting said element to provide freedom of rotation about a vertical axis, permanent magnet means secured to said element for producing a flux the resultant of which is parallel to said vertical axis of rotation, and stationary magnetic flux producing means positioned below said permanent magnet means and in axial alignment therewith for producing a flux to repel said permanent magnet means vertically upward.

9. In a magnetic suspension for supporting an element rotated by electrical means about a vertical axis, a cylindrical permanent magnet polarized in the direction of its longitudinal axis, a shaft positioned coaxially with said magnet, a thin disk-shaped permanent magnet provided with a central bearing and adapted for rotation in a horizontal plane about said shaft, said permanent magnet being connected to the element to be supported and polarized in a direction parallel to its axis of rotation and parallel to the polar axis of said first permanent magnet, the adjacent poles of said permanent magnets being such that a repulsion force is produced to floatingly support said second permanent magnet in opposition to the force of gravity.

10. In a watthour meter having a movable element constrained to rotate about and move along a fixed axis, said movable element including a current conducting disk and a vertical shaft, a first driving element positioned to produce eddy currents in said disk, a second driving element arranged in diametrically opposed relation to said first driving element and positioned to produce eddy currents in said disk, a plurality of diametrically opposed magnetic braking elements acting on said disk, each of said braking elements being displaced approximately ninety degrees from said driving elements with respect to said axis, permanent magnet means secured to said movable element and polarized to produce a magnetic flux parallel to said axis, a second flux producing element positioned beneath said permanent magnet and polarized to produce a resultant flux parallel to and in opposition to the flux produced by said magnet, and means for securing said second flux producing element to a fixed support, whereby said movable element is floatingly supported by a magnetic force of repulsion in opposition to the force of gravity.

11. In a magnetic suspension system, a guide bearing, a first permanent magnet means circularly arranged about a vertical axis passing through said guide bearing, means rotatable about said vertical axis and guided by said bearing, a second permanent magnet means circularly arranged about said rotatable means and fixed thereto in a position above said first permanent magnet means, one of said permanent magnet means having one pole thereof confronted by a like pole of the other of said magnet means in all positions of rotation of said rotatable means, whereby a magnetic force of repulsion is produced between said first and second permanent magnet means for floatingly supporting said rotatable means and said second permanent magnet means.

12. In combination in a magnetic suspension, a fixed permanent magnet polarized in a vertical direction, a rotatable permanent magnet constructed in the form of a cylinder, said rotatable permanent magnet being positioned above said fixed permanent magnet and having its axis of polarization in alignment with the axis of polarization of said fixed permanent magnet, said magnets being polarized in relatively opposite directions so that one pole of one magnet is confronted by a like pole of the other magnet to produce a magnetic force of repulsion of sufficient magnitude to suspend in floating relation said rotatable permanent magnet, a rotatable member to be supported secured to said rotatable permanent magnet, and means for guiding said rotary member.

13. In a magnetic suspension, a pair of permanent magnet means symmetrically and circularly arranged with respect to a common vertical axis one relatively above the other, and means for rotatively supporting the upper permanent magnet means about such axis such that a lower portion of the upper permanent magnet means is above and closely adjacent an upper portion of the lower permanent magnet means, said permanent magnet means being polarized in a direction parallel to the vertical axis such that said adjacent portions are of like polarity in all relatively rotary positions thereof, whereby a vertically acting force of magnetic repulsion is produced between said means for floatingly supporting said rotary permanent magnet.

14. In a watthour meter, a bearing for the rotor of said meter comprising, a permanent magnet forming a portion of the shaft of said rotor, a second permanent magnet mounted on a stationary part of said meter adjacent said first-mentioned magnet, like poles of said magnets being adjacent each other whereby the repulsion between said magnets suspends said rotor, and a non-magnetic element forming the support for said second magnet.

15. In a watthour meter, a disk forming a portion of the rotor, a permanent magnet forming a portion of the shaft of the rotor, a stationary bearing holding the upper end of said shaft of said rotor against lateral displacement, and a second permanent magnet mounted beneath said first-mentioned magnet and aligned therewith, like poles of said magnets confronting each other so that said magnets repel each other and support the rotor.

HAROLD T. FAUS.